Figure 1:
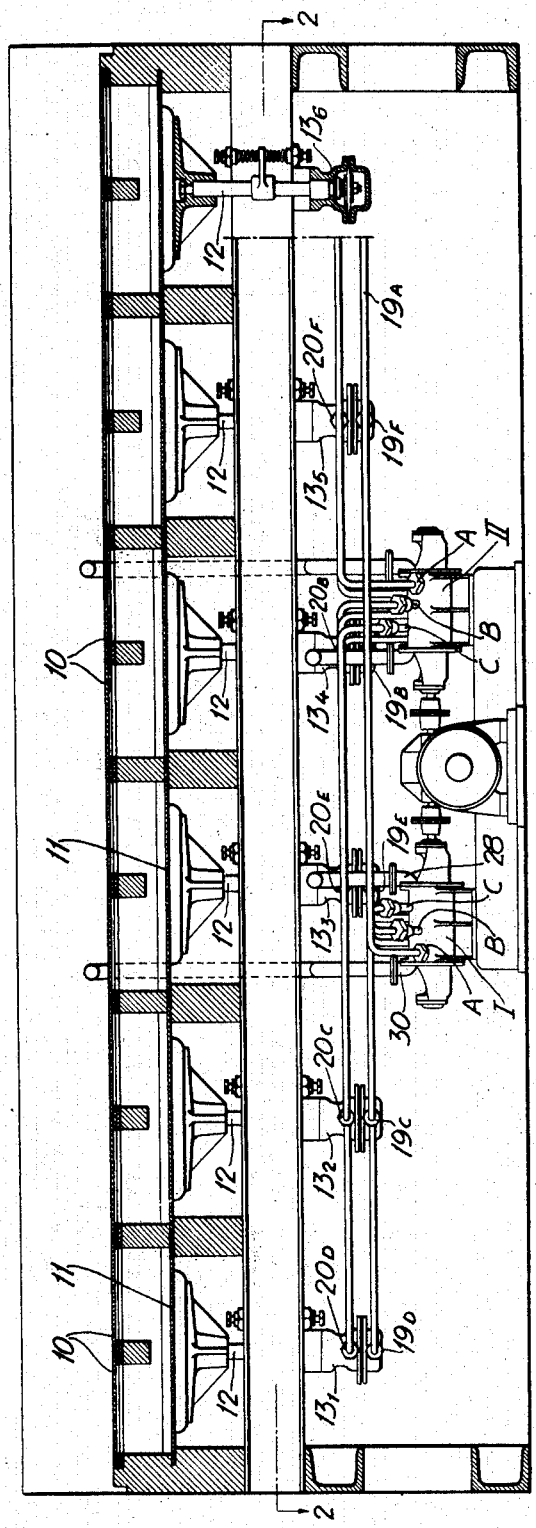

Aug. 19, 1941.  E. W. HEDBERG  2,252,890
PULP SCREEN
Filed March 25, 1939  6 Sheets-Sheet 1

Inventor.
Elon W. Hedberg
by Heard Smith & Tennant
Attys.

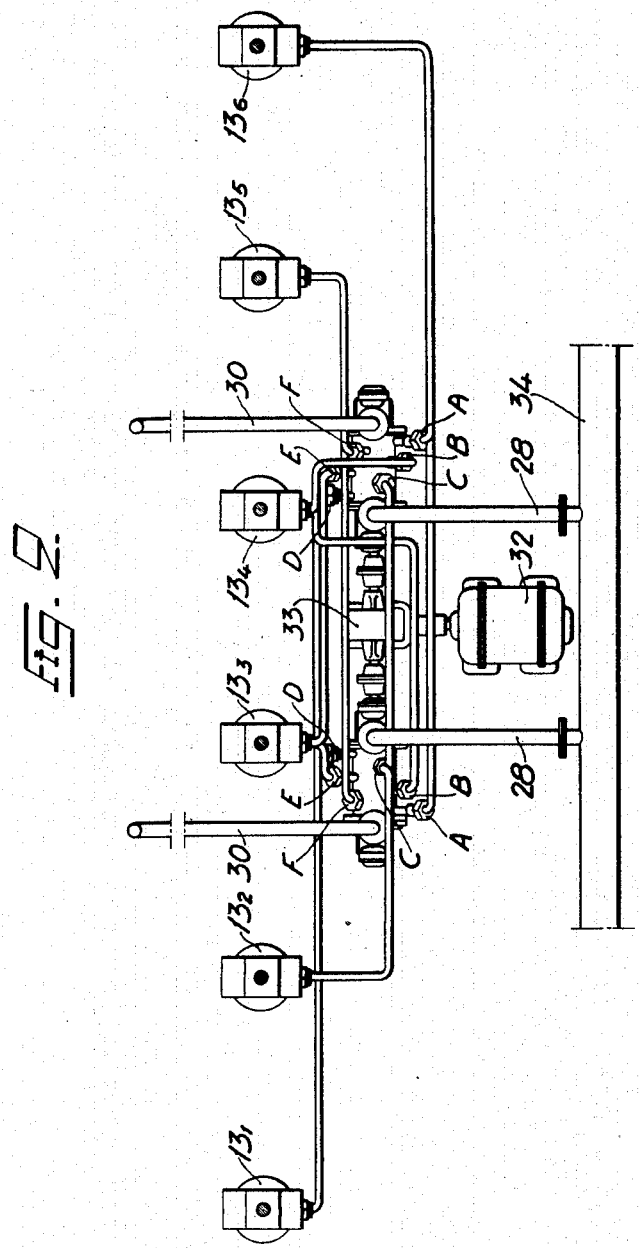

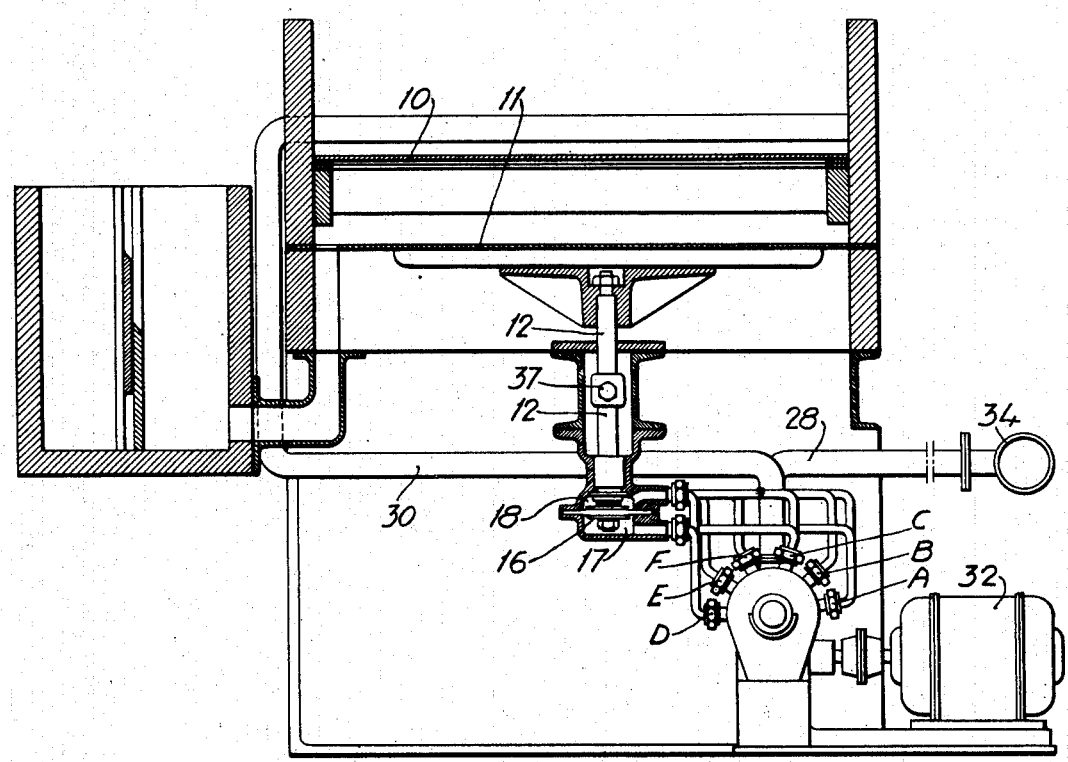

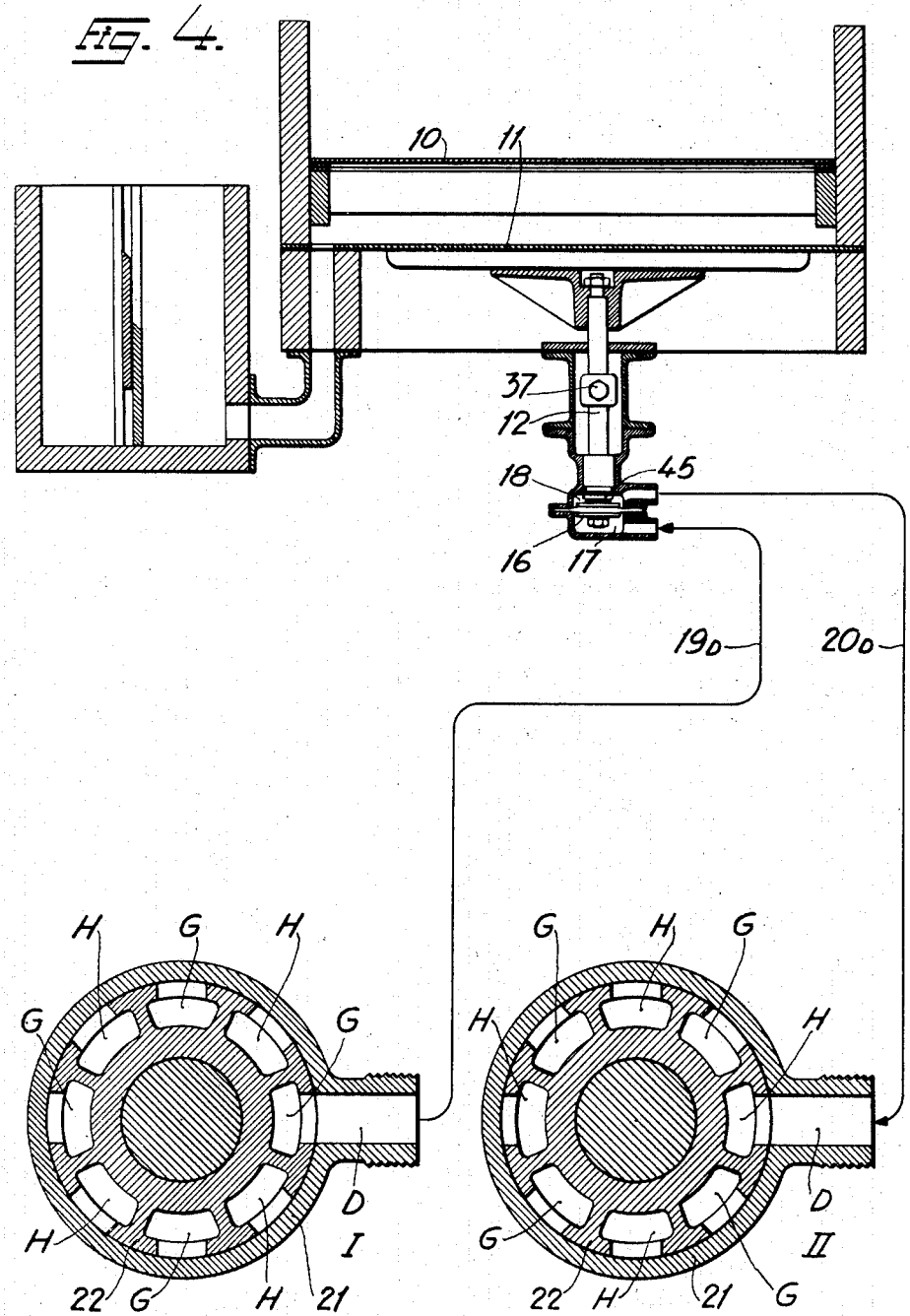

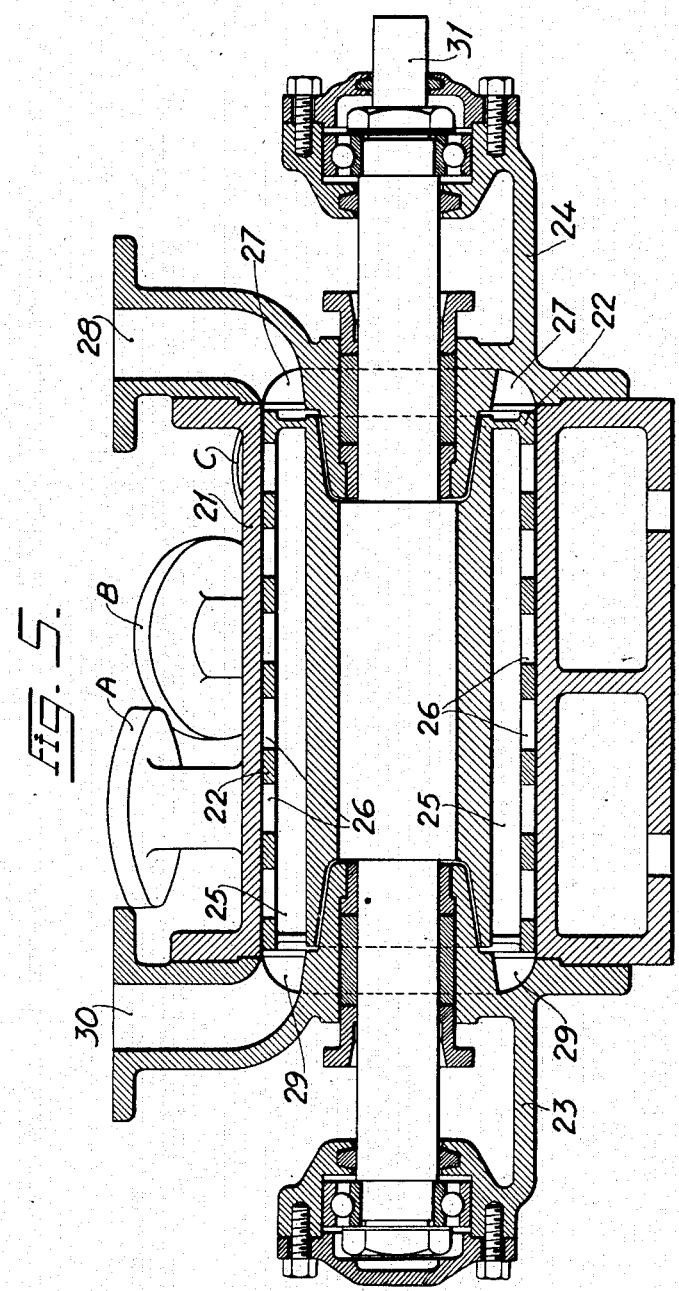

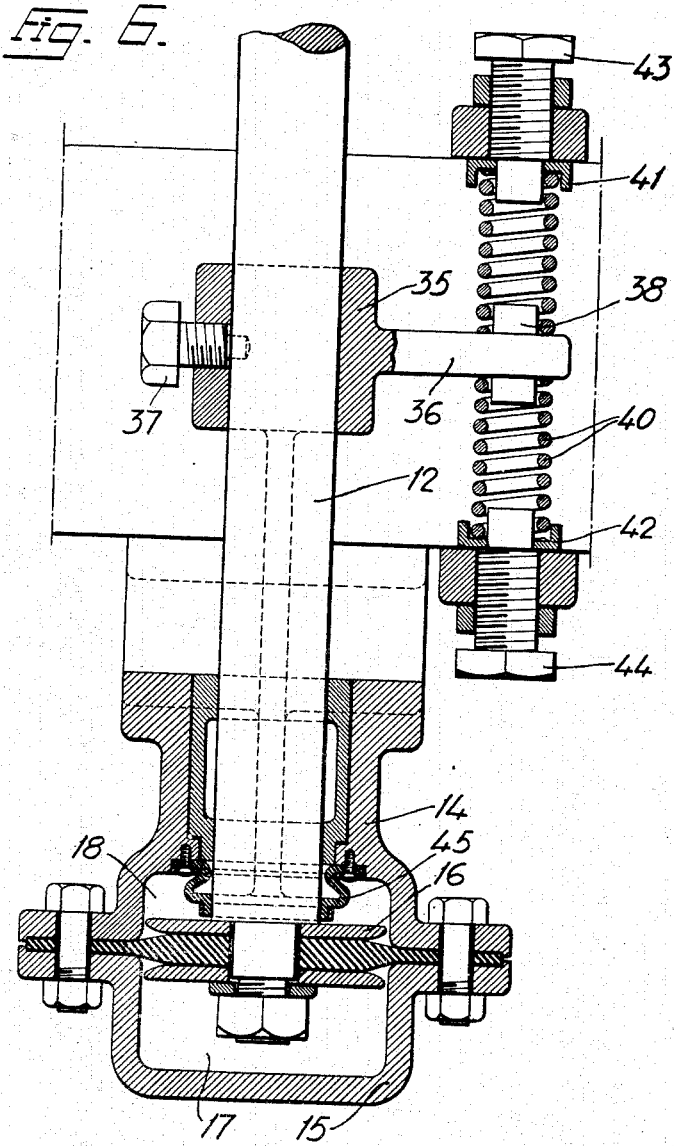

Patented Aug. 19, 1941

2,252,890

UNITED STATES PATENT OFFICE 2,252,890

PULP SCREEN

Elon Wilhelm Hedberg, Wallvik, Sweden

Application March 25, 1939, Serial No. 264,135
In Sweden April 2, 1938

3 Claims. (Cl. 60—97)

The present invention relates to a device for effecting a reciprocating motion of the gasket or gaskets in pulp screens by means of a pressure medium acting alternately in pressure chambers on either side of a driving member, for example a pressure piston or membrane.

It is essential for the invention that the pressure chambers through pipes communicate with a valve device, the controlling member of which consists of a rotor (possibly distributed on several shafts) having a system of channels, said system being provided to connect, during the rotation of the controlling member, one pressure chamber with an inlet and the other pressure chamber simultaneously with an outlet for the pressure medium and vice versa.

The valve device preferably consists of a cylinder, the curved surface of which is provided with apertures communicating with the pressure chambers, the controlling member, which is rotatably mounted in the cylinder, having longitudinally extending channels, which in a certain position communicate with the apertures in said curved surface for effecting the desired change of pressure. Every second of the longitudinally extending channels of the controlling member is then in communication with the inlet for the pressure medium and the others with the outlet for the pressure medium. There is preferably one valve device for imparting to a number of gaskets the motion that is directed towards the screen and one valve device for effecting the opposite motion. In this case the valve devices may be provided on the same shaft.

In order to adjust the length of the movement of the driving member the same may be connected with an elastically yielding device such as a spring device.

The accompanying drawings show one embodiment of a device according to the invention applied to a plane screen for screening fibrous material suspended in water. Figure 1 is a side view of the screen, partly in section, Figure 2 is a section on the line 2—2 of Figure 1, Figure 3 is an end view of the screen and Figure 4 shows, partly diagrammatically and on a larger scale, a detail of the valve members and part of the screen. Figure 5 is a longitudinal section on a larger scale through the valve device and Figure 6 shows a device for controlling the length of the stroke of the driving member.

The screen is provided with twelve screen plates 10, beneath which six gaskets 11 are provided for effecting pulsation in the pulp suspension. Each gasket is by means of the rod 12 connected with a servomotor 13$_1$, 13$_2$, 13$_3$, 13$_4$, 13$_5$, 13$_6$. Each servomotor (see Figure 6) consists of a cylinder 14, a cylinder cover 15, and a rubber membrane 16 provided therebetween, said membrane being fixed to the rod 12, a pressure chamber 17 and 18, respectively, being thereby formed on either side of the membrane. From the chamber 17 in each servomotor a pipe 19$_A$, 19$_B$, 19$_C$, 19$_D$, 19$_E$ and 19$_F$ extends to the valve device I and from the chamber 18 a pipe 20$_A$, 20$_B$, 20$_C$, 20$_D$, 20$_E$, and 20$_F$ extends to the valve device II. In order to obtain a perfect tightening between the rod 12 and the upper pressure chamber 18 a rubber collar 45 is fixed in the wall of the cylinder 14 and the rod 12. The membrane 16 is preferably made of synthetic rubber.

Each valve device (see Figure 5) consists of a cylindrical valve casing 21, a slide or rotor 22 and two covers 23 and 24. In the cylindrical part of the valve casing 21 of valve device I there are provided apertures to which the pipes 19$_A$, 19$_B$ et cetera are connected by means of the pipe sockets A, B, C, D, E and F. The cylindrical part of valve casing 21 of valve device II is provided with six apertures to which pipes 20$_A$, 20$_B$, 20$_C$, 20$_D$, 20$_E$, 20$_F$, are connected by means of pipe sockets indicated at A, B, C, D, E, and F. The rotor 22 of each valve device is provided with longitudinally extending channels 25, which in a certain position by means of apertures 26 in the curved surface may be connected with the apertures in the valve casing 21. The rotor 22 is mounted on ball bearings in the covers 23 and 24. Between the cover 24 and the rotor 22 there is an annular space 27 connected with a pipe 28 for supplying water under pressure to every second channel 25, which is open towards the cover 24. The other channels, which are open towards the cover 23, communicate by means of the annular space 29 with an outlet pipe 30 for the water. The shaft of the rotor is indicated by 31.

In the embodiment shown in the drawings the two valve devices described hereinbefore are coupled together, the rotors 22 being driven in common by a motor 32 via a worm gear 33. The coupling is made in such a manner that when any pipe 19$_A$—19$_F$ is connected to a channel 25 in the rotor of the valve device I which is in communication with the inlet pipe 28 for pressure liquid, the corresponding pipe 20$_A$—20$_F$ will be simultaneously connected to a channel in the rotor of the valve device II which is in communication with the outlet pipe 30 of said valve device II. When the inlet of the valve device I is open to any servomotor, the outlet of the valve device II is also open to the same servomotor, and when any inlet of the valve device II is open to any servomotor, the outlet of the valve device I is also open to the same servomotor.

It will be noted from Fig. 4 that the circumferential dimension of the apertures 26 which communicate with the channels 25 are substantially the same as the circumferential dimension of the ports or apertures in the valve casing for the pipe sockets A, B, C, D, and that there are a multiplicity of channels in each rotor (eight such channels being shown in the drawings), and further, that the apertures or ports 26 for adjacent channels are spaced apart a distance which is an increment greater than the circumferential dimension of the ports, so that as soon as any channel 25 has been carried out of communication with a port in the side wall of the casing, the next channel 25 will be immediately brought into communication with said port.

The mode of operation of the device is illustrated in Figure 4, wherein the valve devices are diagrammatically shown in cross section and, for the sake of simplicity, only one of the pipe sockets connected to the apertures of the valve casing, namely D, is visible. As stated above every second of the longitudinally extending channels 25 is in communication with the pipe for supplying pressure liquid. These channels are indicated by G and the channels communicating with the outlet pipe by H. In the position assumed by the rotor in the valve device I pressure liquid is, consequently, supplied to the pipe 19D and to the lower pressure chamber 17 of the servomotor 13₁ through the channel G located right in front of the socket D, the gasket 11 thereby receiving an upward movement. The pressure chamber 18 then communicates with the channel H in the rotor of the valve device II through the pipe 20D and the socket D in said valve device, the liquid in the pressure chamber 18 flowing to the outlet pipe. When at the rotation of the rotors or slides 22 the channels H and G, which follow behind in the direction of rotation, get into communication with the pipes 19D and 20D, the chamber 18 in the servomotor will stand under pressure and the chamber 17 will communicate with the outlet pipe. Consequently, an up and down motion of the gaskets 11 is obtained. Because of the presence of the multiplicity of channels in each rotor 22, the diaphragm 16 of each servomotor will be given a multiplicity of up-and-down movements for each rotation of the rotor, and thus a rapid vibratory motion for the gaskets is provided for, which is highly desirable in pulp screening apparatus.

The number of gaskets 11 depends upon the size of the screen. In the present case there are six gaskets, and consequently, six pipes 19 and 20, respectively, emanate from the cylinder or valve casing 21 in each valve device each to a servomotor 13. The apertures in the curved surface of the cylinder are provided along a screw line so that the motors are operated successively. Thereby the gaskets 11 will successively receive the up and down motion. If it is desired that the up and down motion shall simultaneously be imparted to all or certain of the gaskets all or certain of the apertures in the curved surface of the cylinder are provided along a generatrix, all or certain of the apertures being then simultaneously connected with the channels 25 at the turning of the rotor.

The pressure medium, as already mentioned, preferably consists of water and is supplied to the valve devices from a main pipe 34 via the pipes 28. The water coming from the servomotors leaves through the pipes 30 and is then used as spray liquid but may also be led back and again used as pressure liquid. The pipe 34 may be in communication with a pump, but the pressure may also be created in another manner.

In order to adjust the length of the pulsation strokes a sleeve 35 having an arm 36 is displaceable on the rod 12. The sleeve 35 may by means of the locking screw 37 be fixed on the rod 12 in a certain position. The arm 36 is provided with a pin 38, the ends of which enter two compression springs 39 and 40. The spring ends remote from the pin 38 are mounted in spring holders 41 and 42. The compression of the springs may be controlled by means of setting screws 43 and 44 provided in the screen frame, said screws acting on the spring holders 41 and 42, respectively. If desired, various speeds of the up and down stroke may be obtained by different compression of the springs.

The invention may also be applied to rotating screens.

In the device described hereinbefore two valve devices are coupled together to effect the desired change of pressure. Of course it is also possible to use only one valve device for this purpose, in which case the pipes communicating with the pressure chambers of the servomotor are connected with a longitudinally extending channel in the rotor, said channel being in communication with the pressure pipe, as well as with another channel in the same rotor connected to the outlet pipe.

Having now described my invention, what I claim as new and desire to secure by Letters Patent is:

1. A pulp screen of the type having a plurality of vibratory gaskets for producing a pulsating movement of the pulp being screened, comprising a plurality of motors for vibrating the gaskets, one motor for each gasket, each motor comprising a casing presenting two pressure chambers separated by a vibratory diaphragm which is connected to the corresponding gasket, a valve device for controlling the motors, said valve device having two cylindrical valve casings, each provided at one end with an outlet opening and at the other end with a supply opening leading to a pressure pipe, the cylindrical wall of both valve casings having a plurality of similar ports, one for each motor, the ports of each valve casing being equally spaced apart circumferentially and each having a relatively small dimension in a circumferential direction, and the ports of the two valve casings having an identical arrangement, a pipe connecting one chamber of each motor to the corresponding port of one valve casing, another pipe connecting the other chamber of each motor to the corresponding port of the other valve casing, a rotary controlling member in each valve casing having a multiplicity of longitudinal channels equally spaced around its circumference, each channel being open at the circumference of the controlling member and the dimension of each channel opening circumferentially of the controlling member being no greater than the circumferential dimension of the ports, and the adjacent channels being spaced apart a distance which is an increment greater than the circumferential dimensions of the ports, the alternate channels of each controlling member having constant communication with the exhaust opening for the corresponding valve casing and the remaining channels of each controlling member having constant communication with the supply opening, and means to rotate the controlling members synchronously, said ports and channels being so arranged that when during the rotation of the controlling members a channel of one controlling member which is in communication with the supply opening is in register with a port leading to one pressure chamber of any motor, the other pressure chamber of said motor is in communication with the outlet opening through a channel of the other controlling member.

2. A pulp screen of the type having a plurality of vibratory gaskets for producing pulsating movement of the pulp being screened, comprising a plurality of motors for vibrating the gaskets, one motor for each gasket, each motor comprising a casing presenting two pressure chambers separated by a vibratory diaphragm which is connected to the corresponding gasket, a valve device for controlling the motors, said valve device having a cylindrical casing element provided at one end with an exhaust opening, and at the other end with the supply opening leading to a pressure pipe, said cylindrical casing element having a plurality of pairs of similar ports, one pair of ports for each motor, the ports being spaced apart circumferentially of the casing element, a pipe connecting one chamber of each motor to one port of the corresponding pair of ports, another pipe connecting the other chamber of each motor to the other port of said pair of ports, a rotary controlling member in the casing element having a multiplicity of longitudinal channels equally spaced around its circumference, each channel being open at the circumference of the rotating member and each channel opening having a dimension circumferentially of the controlling member no greater than the circumferential dimension of the ports, and the adjacent channels being spaced apart a distance which is an increment greater than the circumferential dimension of the ports, the alternate channels of the rotary element having constant communication with the outlet port and the remaining channels having constant communication with the supply port, and means to rotate the controlling member, said ports and channels being so arranged that when during the rotation of the controlling member a channel which is in communication with the supply opening is in register with a port leading to one pressure chamber of any motor, another channel which is in communication with the outlet opening is in register with a port connected to the other chamber of said motor.

3. A pulp screen such as described in claim 2 in which the diaphragm of each motor is connected to its gasket by a rod, characterized by the use of an arm secured to and extending laterally from each rod, two compression springs acting on opposite sides of said arm, one of said springs resisting movement of the rod in one direction from a central point and the other spring resisting movement of the rod in the other direction from said central point, and means to adjust the tension of each spring.

ELON WILHELM HEDBERG.